United States Patent [19]

Čech et al.

[11] 4,321,947
[45] Mar. 30, 1982

[54] APPARATUS FOR CONTROLLING PRESSURE FLUID DISTRIBUTION, PARTICULARLY IN JET LOOMS

[75] Inventors: Miloslav Čech, Brno; Vladimír Vašíček, Moravsky Krumlov; Vladimir Kuda, Blazovice, all of Czechoslovakia

[73] Assignee: Vyzkumny a vyvojovy ustav Zavodu vseobecneho strojirenstvi, Brno, Czechoslovakia

[21] Appl. No.: 158,489

[22] Filed: Jun. 11, 1980

[30] Foreign Application Priority Data

Jun. 11, 1979 [CS] Czechoslovakia .................. 4044-79

[51] Int. Cl.³ ............................................. F16K 37/00
[52] U.S. Cl. .................. 137/556; 137/624.2; 251/263; 139/435
[58] Field of Search ........... 137/552, 553, 556, 624.17, 137/624.18, 624.2; 251/256, 263, 77

[56] References Cited

U.S. PATENT DOCUMENTS

| | | | |
|---|---|---|---|
| 1,218,010 | 3/1917 | Soss | 251/263 |
| 1,365,541 | 1/1921 | Rankin | 137/624.17 |
| 2,064,265 | 12/1936 | Marlowe | 251/263 |
| 2,131,785 | 10/1938 | Ribble | 251/77 |
| 2,833,307 | 5/1958 | Henderson | 137/556 |
| 2,914,088 | 11/1959 | Beaman et al. | 137/553 |
| 3,128,635 | 4/1964 | Doolittle | 137/624.17 |
| 4,241,766 | 12/1980 | Ushiro et al. | 139/435 |

Primary Examiner—A. Michael Chambers

[57] ABSTRACT

The present invention relates to an apparatus for accurately controlling the distribution of pressure fluid through a number of branch conduits, the apparatus being advantageously employed for jet looms. The apparatus eliminates excessive wear of mutually engaged parts which would otherwise cause unwanted time delays in the operative steps of the system with which it is employed. The apparatus includes a plurality of valves, each valve having a movable valve element coupled with the outer race of an anti-friction bearing mounted on an eccentric by means of a piston and a push rod provided with a spring which maintains the piston in engagement with the outer race. The valve is opened when a stop on the piston is moved by the eccentrics into engagement with the other end of a push rod which forms a part of the movable valve element.

5 Claims, 4 Drawing Figures

APPARATUS FOR CONTROLLING PRESSURE FLUID DISTRIBUTION, PARTICULARLY IN JET LOOMS

The present invention relates to an apparatus for controlling pressure fluid distribution, particularly in jet looms.

Efficient jet looms use one inserting nozzle for a pulse weft insertion into the shed; this is usually insufficient for larger weaving widths. Beside the main or primary nozzle, which acts upon the weft in such manner that the weft is withdrawn from the magazine by the action of pressure fluid and accelerated in an inserting device, e.g. a comb, the weft is also acted upon by the pressure fluid by means of active elements distributed along the weft inserting device through the shed of warp threads. By means of active elements with additional pressure fluid sources, the efficiency of weft insertion by the main nozzle is enhanced. A pressure wave is formed, which acts upon the weft, particularly in its front part, to which there is imparted a part of the kinetic energy of said pressure wave, the weft thread thus being set into motion. In view of the necessity of controlling the pulses in the required rhythms of weft insertion and synchronously with the motion of the slay and the healdshafts of the loom, it is necessary to control the output of the pressure fluid from both the primary nozzle and the active elements of the comb. At the same time, the purpose is to achieve a continuous weft motion, which must be controlled by a suitably built velocity field, particularly by the intermediary of pressure fluid leaving the active elements, to obtain an optimum, e.g. a successive action upon the front part of the weft in the shed path. An adequate velocity field must be formed for various kinds of yarn with different mass, both of these factors influence even the course of the insertion time.

Mechanisms for controlling the distribution of pressure fluid into the main nozzle and the active elements, hitherto known for carrying out the appropriate actions, usually use one of two best known arrangements.

In one known mechanism used for distributing pressure fluid to the main nozzle and to the active elements, valves with spring elements are used, the valves being controlled by cams. The transfer of the motion of the rotating cam to the movable valve element or cone is performed by means of a tie rod provided with a cam follower such as a rotatable roller or a sliding block, which is in contact with the circumferential surface of the cam on a shaft coupled with the driving means of the loom.

The outflow of the pressure fluid at the required moments, and the time gap from the nozzle and the active elements are dictated by the shapes of the cams on the shaft of the mechanism for controlling the distribution of the pressure fluid; a precise and particular adjustment of the angular positions of the cams as well as the operative changes of the elements coupled thereto, is thus necessary.

The disadvantage of this known construction thus consists in the requirement for the precise angular adjustment of the position at which the valve cone opens the inlet and closes the outlet of pressure fluid to the nozzle and the active elements. Even with such precise adjustment, no simple timing is achieved, i.e. a re-arrangement of means for prolonging or shortening the time gap for the pressure fluid supply is required, particularly as to the separately arranged active elements.

The above-described known mechanism has further disadvantages, which become apparent particularly in looms of higher efficiency. When using a sliding block on the valve tie rod, both the cam and the sliding block are subjected to wear, since they are in continuous contact. However, when the sliding block is replaced by a roller, due to the higher speed of rotation of the roller not only the cam and the roller surface undergo wear, but also the roll mounting means, e.g. the roller shaft. Due to excessive wear, the clearance between the connections of said maens becomes larger; this results in a delay of response in view of the required speed of the loom operation, thereby resulting in a lower quality of the fabric produced.

Another known mechanism for controlling the distribution of pressure fluid for weft insertion is based on the electronic control of solenoid valves responding to predetermined phases of operating cycles of the loom. The rotating means, e.g. the main shaft of the loom, is substantially provided by a usually contactless scanning means for determining its angular position. The signals from said scanning means are brought by the intermediary of a signal shaping circuit to an electronic circuit, which usually comprises a plurality of monostable sweep circuit in which the signals are distributed to amplifiers, and the modified signals or pulses are conducted to the controlling inputs of solenoid valves. Such valves control the moment of opening or closing of the pressure fluid input, the time gaps of blowing by the intermediary of the nozzle and active elements, e.g. additional blowing gliders along the weft inserting device of the loom. A change of timing of the pressure fluid input is effected by modifying the time constants of the monostable sweep circuits by e.g. variable resistors.

The principle of the above-described mechanism in arrangements has been changed and improved by the development of other known arrangements, since this mechanism has several disadvantages.

A substantial disadvantage of the described mechanism consists in its relatively high initial cost, the cost of its maintenance, and the high requirements as to operation and lifetime of electrically controlled operating elements.

The above disadvantages are substantially mitigated by the improved mechanism for controlling the distribution of pressure fluid according to the present invention. In accordance with the invention, the valve cone is coupled with the outer ring of an anti-friction bearing mounted on an eccentric by the intermediary of a piston and a tie rod provided with a spring, the stop of the piston being in engagement with the front of the tie rod. A further improvement in accordance with the present invention consists of the fact that the eccentric with the anti-friction bearing is made immovable on the shaft between rings which are connected to the shaft by means of wedges and are gripped by nuts. Another improvement consists in that the stop is adjustably mounted on the piston, thus making it possible to change the time of opening the cone. A further substantial improvement of the present invention is that the piston is in constant engagement, by the action of a spring, with the outer circumference of the anti-friction bearing. Another substantial improvement of the present invention consists in that the ring is provided on its circumference with a scale cooperating with an arrow mounted on the front part of the eccentric.

A preferred embodiment of the apparatus of the invention is shown in the accompanying drawings, in which.

Figure 1:
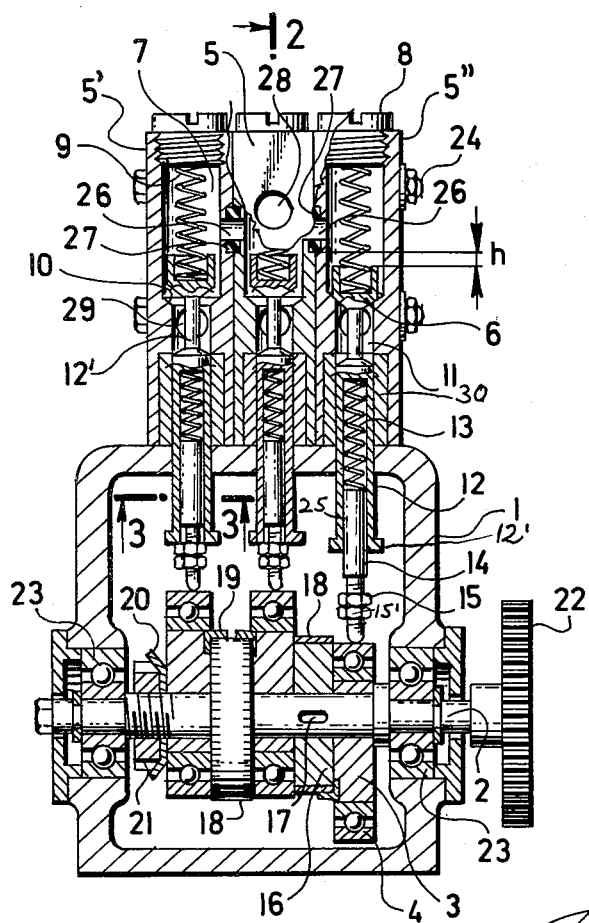
FIG. 1 is a view in longitudinal section through the apparatus for controlling the distribution of pressure fluid, the apparatus being shown with two of its valves in open operative position, several of the parts being shown in side elevation.
Figure 2:
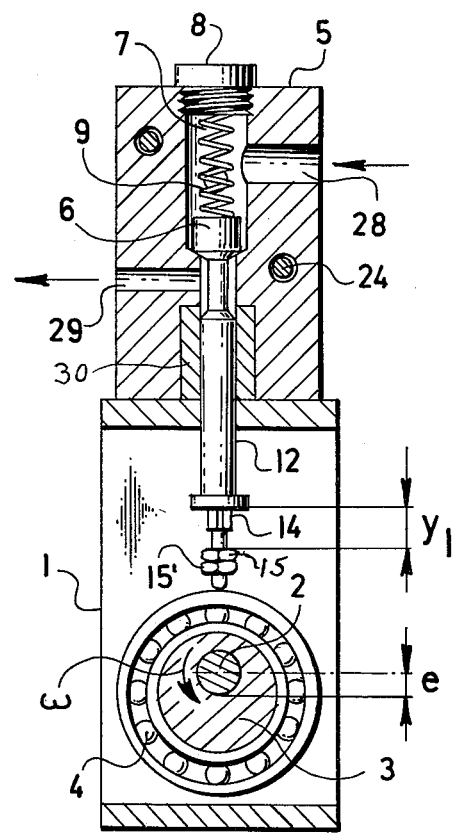
FIG. 2 is a view in vertical section along the line 2—2 through the embodiment shown in FIG. 1, several of the parts being shown in side elevation, the valve shown in this figure being closed.
Figure 3:
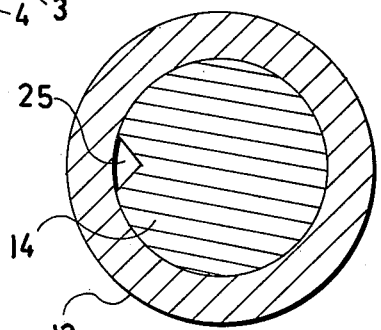
FIG. 3 is a view in horizontal cross section through the embodiment shown in FIG. 1, the section being taken along the line 3—3 in FIG. 1.

The apparatus for controlling the distribution of pressure fluid according to the present invention with reference to an exemplary embodiment as shown in FIGS. 1, 2 and 3 of the accompanying drawings constructed as follows:

The apparatus has a housing 1, e.g. in the form of a right parallelepiped, which is made advantageously as a hollow light-metal casting, a horizontal shaft 2 is rotatably mounted in bearings 23 in opposite openings in longitudinal direction, in the walls of the housing. Furthermore, vertical openings are provided in the upper wall of the housing for receiving reciprocable valve push rods 12. Said housing 1 is e.g. dismountable by parts, or is provided in another, more advantageous embodiment, with an assembling opening, which has e.g. a rectangular profile, said opening being parallel to the horizontal arrangement of the shaft 2 and is advantageously provided with a transparent cover with sealing, said parts being connected to the housing 1 by screws. The housing 1 can be advantageously provided in its support part with feet provided with openings for the connecting means for fastening the housing to a loom. Above shaft 2 in the upper part of housing 1, bodies 5,5', 5" in the form of sub-housings are mounted, such bodies being connected to housing 1 by e.g. feet with screws countersunk in the wall of housing 1. The bodies 5,5', 5" are mutually connected by connecting means, e.g. transversally arranged bolts 24 passing therethrough, which are provided with nuts. At least one end of shaft 2 projects from housing 1, such end of the shaft being provided with a driving means 22, e.g. a gear mounted on shaft 2 by means of a key. Said driving means 22 is coupled by means of a transmission such as a gear (not shown) with the driving unit of the loom. The bearings 23 in which shaft 2 is mounted are secured in the axial direction advantageously against displacement by means of bearing caps mounted outside the walls of housing 1. Said bearing caps have their contact surfaces in contact with the front surface of the outer ring of bearings 23, which has its inner ring axially secured e.g. by a spring securing ring mounted in an annular groove in shaft 2. A nut 21 with a securing element in the form of a spring washer 20 is mounted on shaft 2 axially inwardly of the left hand bearing 23 (FIG. 1).

Mounted upon shaft 2 are three eccentrics 3, a disk 16 secured from rotation by keys 17 being disposed between the eccentrics in each successive pair of eccentrics. The eccentrics and the disk 16 are held in compression by the nut 21 acting through the spring washer 20. Upon loosening the nut 21, the eccentrics 3 can be adjusted by rotating them with respect to the shaft, following which they are held in adjusted position by tightening the nut 21. The disks 16 are provided with scales 18 graduated in angular degrees, preferably in steps of 5 degrees, within an angular range ω from 0° to 360°. Scales 18 cooperate with indicators 19 which are secured to the respective eccentrics 3. Indicators 19 are preferably made in the form of a metal piece of L-shape, as connected to the adjacent side of the corresponding eccentrics 3 as by a countersunk screw. Each of the eccentrics 3 is provided with an anti-friction bearing 4, the inner race of which is fixedly mounted upon the body of the eccentric as by being pressed thereon.

Three sub-housings, 5, 5' and 5", are mounted in a row upon the top of the housing 1, the sub-housings being aligned with the respective eccentrics, as shown in FIG. 1. Each of the sub-housings as a vertical bore therein, the upper part being enlarged to form a vertical chamber 7. Chamber 7 communicates at its lower end with a smaller diameter bore 11, chamber 7 and bore 11 being connected by a downwardly converging frusto-conical valve seat 10. A counterbore in each of the sub-housings receives a bearing sleeve 30 the inner surface of which is coextensive with bore 11. Sleeve 30 forms a guide for push rod 12, the lower end of the push rod being in the form of a downwardly open sleeve. The lower end of such sleeve is provided with an annular outer flange, as shown. Above the lower hollow portion of push rod 12 the push rod rises to a smaller diameter circular cylindrical neck 12' which is coaxial with the lower sleeve of the push rod. The upper end of push rod portion 12' is connected to the lower, smaller diameter end of a larger diameter portion bearing a downwardly converging frusto-conical seat 6 which is adapted selectively to cooperate with the fixed valve seat 10 in the sub-housing. The upper end of the push rod 12, above valve seat 6, is made in the form of a cup-like spring seat receiving the lower end of a coil compression spring 9 disposed in the chamber 7. The upper end of chamber 7 is closed and sealed by a screw plug 8 the lower surface of which forms a spring seat for the upper end of spring 9 and holds it in compression so that the movable valve seat 6 sealingly engages the fixed valve seat 10 unless the push rod 12 is thrust upwardly by its respective eccentric 3.

The chamber 7 of sub-housings 5,5' and 5" are interconnected by openings 26 through the inner side walls thereof, openings 26 which are disposed horizontally and coaxially are sealed from the atmosphere by O-rings 27, which are disposed between aligned annular recesses in the side walls of adjacent sub-housings, the O-rings being held in compression by the bolts 24. The central sub-housing 5 has an inlet passage 28 (FIGS. 1 and 2). Each of the sub-housings 5, 5' and 5" is provided with its respective outlet passage 29. It will be seen that when each of the valves 6, 10 of the sub-housings is closed the inward passage 28 of sub-housing 5 is shut off from the outlet passage 29 of such particular sub-housing. It is to be noted that the diameter of the inlet passage 28 of sub-housing 5 is larger than the diameter of the outlet passage 29 of each of the sub-housings.

In the lower hollow end of each of the push rods 12 there is slidably disposed a piston 14, having a coil compression spring 13 interposed between the upper end of the piston 14 and the upper closed end of the passage in the lower end of push rod 12. Springs 13, which are pre-stressed, have a compressive strength less than that of springs 9. The springs 13 constantly thrust the pistons 14 downwardly, so that the lower ends of the pistons remain in constant engagement with the outer races of the bearings 4. The lower ends of the pistons 14 are threaded, and carry an upper stop nut 15 and a lower lock nut 15′ screwed thereonto. The valves 6, 10 and the sub-housings 5, 5′ and 5″ are opened, as is shown in sub-housings 5 and 5′ in FIG. 1, when the respective eccentric 3 has thrust the piston 14 upwardly sufficiently for the top nut 15 thereon to engage the lower flanged end 12′ of the push rod 12 and thereafter to push the movable valve seat 6 upwardly from engagement with the fixed valve seat 10. In order to permit piston 14 to slide within the cylinder formed by the sleeve at the lower end of the push rod 12 without interference by air trapped between the upper end of the cylinder and the upper end of the piston, a longitudinal groove 25, preferably of triangular shape, is provided in the piston 14, as shown, so that air from the upper end of the cylinder can escape freely to the atmosphere.

It will be understood that the outlet passage 29 of one of the sub-housings 5, 5′ and 5″ is connected to the main or primary weft inserting nozzle, and that the outlets 29 of the other sub-housings are connected to respective active elements or groups of elements distributed along the weft inserting comb device. Having determined which of the sub-housings is to control the main or primary weft inserting nozzle, and which of the remaining sub-housings are to control the successive active elements or groups of active elements of the weft inserting comb, the length of time gaps for the distribution of the pressure fluid to the various outlets 29 of the sub-housings is determined. This adjustment is particularly illustrated in FIG. 4, in which the following symbols are used:

y—stroke of piston 14 in mms
$y_1$—distance between the flange 12′ of push rod 12 and stop nut 15 of piston 14 in mms,
h—length of stroke of movable valve seat 6 in mms,
α—angle of turning of the shaft 2 in the initial phase of introduction of pressure fluid °s,
β—angle of turning of the shaft 2 in the intermediate phase of blowing pressure fluid in °s,
ω—angle of turning of the shaft 2 from 0° to 360°.

As above explained, the eccentrics 3 are adjusted angularly about shaft 2 by releasing nut 21 and the spring washer 20, so as to permit the eccentrics to turned appropriately in respect to the shaft. Release of the nut 21 can be carried out by means of a suitable wrench inserted through a rectangular opening in the front surface of housing 1, which is advantageously provided with a transparent cover (not shown). The adjustment of a given eccentric 3 is carried out in such matter that piston 14 associated therewith has a stroke y equal to zero. By adjusting the stop nut 15 on the given piston 14 to the required time of blowing pressure fluid given as an angle, the piston 14 is adjusted in such manner that its stop 15 is re-adjusted relative to the flange or collar 15′ of the push rod 12 to yield a push rod stroke $y_1$. Such adjustment is advantageously performed by means of Johanson's cubes of predetermined size in accordance with the elaborated method tables associated with such tubes in order to secure the required strokes h of movable valve seat 6. The stop nut 15 is then secured in its adjusted position by screwing the corresponding lock nut 15′ tightly against it. The push rods in the other sub-housings 5, 5′ and 5″ are adjusted in the same manner, after which the eccentrics 3 and the disks 16 are clamped on shaft 2 by tightening nut 21.

As above described, shaft 2 with eccentrics 3, adjusted as described above, and with the anti-friction bearings 4 and disks 16 are rotated by the means of gear 22 which is drivingly connected to the driving unit of the loom. The outer surfaces of the outer races of bearings 4 are in continuous contact with the lower ends of the respective pistons 14. Because of the frictional engagements between the lower ends of the pistons and the outer races of the bearings, the outer races of the bearings do not rotate; this is advantageous since it decreases possible mechanical abrasive wear between the piston and the other race of the bearing.

As above explained, spring 13 is in a prestressed state, the force exerted by spring 13 being at least sufficient to press piston 14 towards the circumferential surface of the outer race of bearing 4 when the corresponding eccentric 3 has an angular position in which the stroke y of piston 14 equals zero. The pressure fluids in chamber 7 of sub-housing 5 is supplied, through the intermediary of interconnecting openings 26 in the sub-housings 5, 5′ and 5″ into chamber 7 of sub-housings 5′, 5″, in which the valve seats 6 are positioned by the action of push rods 12 and particularly of pistons 14.

Figure 4:
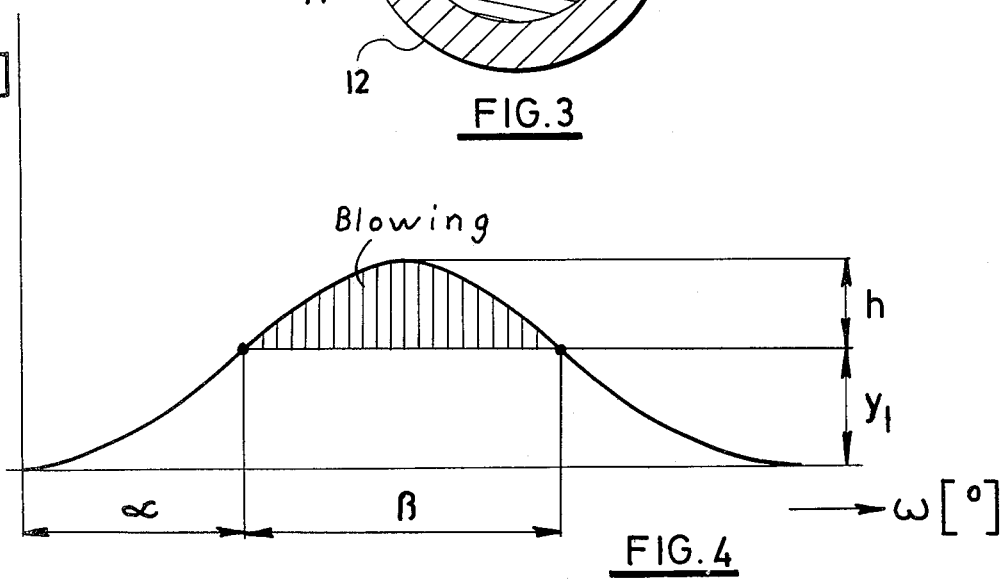
FIG. 4 is a graph showing the relationship between the stroke y of the piston and the angular position ω of the cam or eccentric which drives the movable valve element or cone.

Turning now to FIG. 4, it will be been that the shaft 2 and thus an eccentric 3 secured thereto, initially rotates from a position of 0° through an angle α, during which time the adjusted stop nut 15 rises through a distance $y_1$ to engage the flange or collar 12′ on the bottom end of the push rod 12. Through the rotation of the shaft 2 and the eccentric 3 through an angle β results in the lifting of the movable valve seat 6 from the fixed valve seat 10, thereby producing a flow of blowing fluid to the outlet port 29. Immediately beyond the end of turning of shaft 2 and eccentric 3 through the angle β the stop nut 15 separates from the flange 12′ so that the valve 6, 10 is again closed. Thereafter, the stop nut 15 on the piston 14 retreats downwardly from the flange 12′ through the distance $y_1$.

It will be apparent that the strokes y of a particular piston 14 are out of phase with the strokes of the pistons of the other sub-housings. It is essential that upon a stroke of a length h of valve member 6 the force exerted by the pressure fluid in chamber 7, together with that exerted by spring 9, is overcome on the one end by springs 13 acting upon piston 14 and by the action of the eccentric 3 through the intermediary of bearing 4.

The apparatus of the invention for controlling the distribution of pressure fluid, although particularly applicable for use in jet looms, is also suitable for controlling the distribution of pressure fluid in other systems having branches to which pressure fluid must be delivered in the proper sequence at accurately spaced timed intervals.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. In an apparatus for controlling the pulsed distribution of pressure fluid having a valve with a first, fixed valve seat and a second valve seat mounted on a movable valve element cooperating with the fixed valve seat, the valve element being pressed toward the fixed valve seat by means of a first spring, and an intake on the upstream side of the valve for pressure fluid, the improvement wherein the movable valve element is reciprocated by means of a push rod having a closed-ended bore therein receiving a piston, there being a second, coil compression spring interposed between the posed end of the bore and the piston so that the piston can reciprocate relative to the push rod, and an adjustable stop means on the piston to prevent movement of the piston into the push rod beyond a predetermined distance, a rotatable drive shaft, an eccentric mounted upon the drive shaft for recriprocating the piston of the push rod, the movable valve element being moved to separate the second valve seat thereon from the first, fixed valve seat whereby to open the valve when the adjustable stop on the piston engages the confronting end of the portion of the valve push rod within which the piston reciprocates.

2. Apparatus is claimed in claim 1, comprising means for adjusting the eccentric angularly about the shaft on which it is mounted.

3. Apparatus as claimed in claim 1, comprising an anti-friction bearing having an inner race mounted upon the eccentric, the outer race of the bearing engaging the outer, free end of the piston.

4. Apparatus as claimed in claim 1, wherein the eccentric is mounted on the shaft beside a disk fixedly connected to the shaft, the disk engaging one side face of the eccentric, and a nut with a spring washer forcible engaging the other side face of the eccentric to thrust it against the disk, whereby the eccentric can be angularly adjusted about the shaft and thereafter fixedly held thereon in adjusted position, a scale on the circumference of the disk, and an indicator mounted on the eccentric for cooperation with the scale on the disk.

5. Apparatus comprising an assembly of a plurality of valves as claimed in claim 1, and wherein the eccentrics for the respective valves are mounted for angular adjustment upon a common shaft controlling all of the valves of the assembly.

* * * * *